United States Patent [19]

Pautzke

[11] 4,264,957

[45] Apr. 28, 1981

[54] APPARATUS AND METHOD FOR REGISTER CONTROL IN WEB PROCESSING APPARATUS

[75] Inventor: Anthony W. Pautzke, Dousman, Wis.

[73] Assignee: Zerand Corporation, New Berlin, Wis.

[21] Appl. No.: 41,788

[22] Filed: May 23, 1979

[51] Int. Cl.[3] ........................ G06F 15/46; B65H 23/18

[52] U.S. Cl. .................................... 364/469; 101/248; 226/28

[58] Field of Search ............... 364/469, 118, 560, 562, 364/505, 506, 550, 551; 226/28, 29, 30; 242/57.1, 75.3, 75.5, 75.51; 101/DIG. 21, 248, 181, 183, 184, 226

[56] References Cited

U.S. PATENT DOCUMENTS

| | | | |
|---|---|---|---|
| 3,397,634 | 8/1968 | Betts et al. | 226/28 X |
| 3,525,858 | 8/1970 | Thiede et al. | 364/469 X |
| 3,556,509 | 1/1971 | Crum | 226/28 X |
| 3,653,322 | 4/1972 | Richardson | 101/248 |
| 3,774,016 | 11/1973 | Sterns et al. | 226/28 X |
| 3,806,012 | 4/1974 | Roch | 226/28 X |

*Primary Examiner*—Joseph F. Ruggiero
*Attorney, Agent, or Firm*—James E. Nilles

[57] ABSTRACT

Register control apparatus for a rotogravure color printing press positions an adjustably movable web (or cylinder) compensator mechanism to, in effect, adjust the web length between printing roller nips in successive printing decks to correct for printing registration errors. The register control apparatus employs the principle that there is a predetermined position of the compensator mechanism for any given length of web wherein register error is eliminated. The register control apparatus, which is initially provided or programmed with electronic signal information representative of web length and compensator mechanism position (null position) wherein no registration error occurs, also includes electrical devices and circuitry for sensing and electronically processing incoming signal information relative to web speed; direction, magnitude and rate of registration error; and change of position of the compensator mechanism. The register control apparatus performs computing operations on the programmed signal information and incoming signal information and provides an output signal which locates the compensator mechanism in a position wherein register error is eliminated. The computing operation includes: ascertaining the proportion between the register error and compensator mechanism position; ascertaining the derivative (i.e., relationship) between the rate of change of register error and the rate of change of compensator mechanism position; and integrating to establish the average magnitude of register error and relating it to the average (optimum) position requirement of the compensator mechanism.

14 Claims, 25 Drawing Figures

CYLINDER COMPENSATION 56-1
WEB LENTH FACTOR ($A_1$) INPUT

APPARATUS AND METHOD FOR REGISTER CONTROL IN WEB PROCESSING APPARATUS

BACKGROUND OF THE INVENTION

1. Field of Use

This invention relates generally to apparatus and methods for register control in web processing apparatus, such as multi-deck rotogravure color printing presses, or the like, which employ adjustably positionable web or cylinder compensator mechanisms for varying web length between printing decks to eliminate register errors.

2. Description of the Prior Art

Some prior art register control systems sense and measure only the magnitude and direction of register errors and adjust the compensator mechanism position accordingly to effect a change in web length and thereby eliminate register error. In such prior art systems, compensation is relatively slow and allows considerable register error to accumulate while a correction is being made. Attempts to increase compensator rate of change in such systems result in instability, oscillation and poor registration. In effect, such prior art systems involve random (trial and error) positioning of the compensator until an optimum position of the compensator is found wherein register error is eliminated, but due to the cyclic nature of the process, this optimum position is rarely achieved. One type of prior art register control system employs a strain gauge for measuring web tension between successive roller nips and operates to locate the compensator in a position wherein a desired web tension, considered to be indicative of no register error, is maintained. However, there are many variables which affect web characteristics and web tension, such as moisture and humidity, and therefore the last-mentioned prior art systems allow register errors to occur, even though a predetermined web tension is being maintained, because web conditions are actually changing.

SUMMARY OF THE PRESENT INVENTION

Applicants have discovered in connection with register control apparatus for web processing apparatus, such as printing presses, that there is an important and usable relationship between the length of web between the printing roller nips in successive printing decks, the magnitude (length) of a register error, and the position of the compensator mechanism which acts upon the web between decks to adjust web length therebetween. To put it another way, for every web length between successive pairs of roller nips, there is an optimum position for the compensator mechanism wherein a desired web length is established and register error is eliminated and this optimum compensator mechanism position can be ascertained and established by means of register control apparatus and method in accordance with the present invention. For example, if the length of web between printing roller nips to provide correct registration is known to be 30 feet (i.e. 15 repeats of 24" repeat length each), and if the register error is ascertained to be 0.006 inch per foot of web, then the length of the web path must be changed 0.18 inch to eliminate the register error. If the position of the compensator mechanism is already known, then a calculation can be made as to how far the compensator mechanism must be moved in the appropriate direction to a new position necessary to effect the decimal change in web length to eliminate register error. Thus, instead of moving the compensator mechanism randomly in a trial and error process until the register error is eliminated, as in prior art register control apparatus and methods, it is possible, in accordance with the present invention, to employ apparatus and method for register control which employs the above principles in conjunction with relevant signal information (both preprogrammed and incoming) to move the compensator mechanism directly to a definite predetermined (calculated) new position wherein the register error is eliminated.

Furthermore, for a register error of given magnitude the compensator mechanism can be moved to the new position within a predetermined time interval to correct the register error within a minimum web length.

Also, because of the changes in the modulus of elasticity in a web, long term (as well as short term) register error can occur. In the case of nominal boxboard material, for example, the actual printed repeat length can vary by as much as 0.007 inch throughout a roll. Since the nominal position of the compensator mechanism is directly related to repeat length, then as the repeat length changes, so must the position of the compensator mechanism change. Therefore, additional signal information to the compensator mechanism is required than was furnished in prior art system. Compensation rate is also directly proportional to web speed. Accordingly, the following signal information is sensed, evaluated and computed in accordance with the system and method of the present invention: web speed; magnitude, direction, and rate of change of register error; compensator position and rate of change of compensator position.

In accordance with the invention there is provided web processing apparatus such as a rotogravure color printing press which includes means for adjusting web length between pairs of printing roller nips in successive printing decks to correct for registration errors. The said means, in one embodiment includes an adjustably positionable compensator mechanism and in another embodiment includes an angularly adjustable cylinder. The register control system includes means for sensing, measuring, and providing signal information relative to web speed; the direction, magnitude and rate of register error; and the position and rate of change of position of the compensator. The register control system, which relies on the principle that there is a predetermined compensator position for a given web length wherein register error is eliminated, also includes means for performing computing operations on the aforesaid signal information to provide a control signal for adjusting compensator position. Such computing operations include:

ascertaining the proportion between the error signal and compensator position; ascertaining the derivative (i.e., relationship) between the rate of change of register error and the rate of change of compensator position; and integrating to establish the average magnitude of the register error and relating it to the average (optimum) position requirement of the compensator.

The method for achieving register control broadly involves the steps of placing the compensator in a nominal (initial) position relative to the pairs of printing roller nips wherein no register error occurs and identifying that first position (by setting the computer to a zero or null condition), measuring the web length between the pair of printing roller nips with no register error present (i.e., providing a web length factor—a gain constant signal supplied to computer), measuring the magnitude of a register error when such occurs, calculating on the basis of measured web length factor, the nominal or initial or null position of the compensator, and register error magnitude a new position for the compensator needed to change web length an amount sufficient to eliminate register error, and moving the compensator to the new position.

A register control system in accordance with the invention results in the elimination of long term and short term register errors and provides improved printing press performance by properly positioning the compensator mechanism at the proper rate to achieve correct registration with a minimum time and with minimum web waste.

A register control system in accordance with the invention can be embodied in web processing apparatus, such as printing presses, during manufacture or in the field and is economical to manufacture, and reliable in use.

A register control in accordance with the invention effects register error correction regardless of the fact that the web is still being subjected to variables which affect web characteristics, such as moisture, humidity, or other machine induced variables.

A register control system in accordance with the invention distinguishes between long-term and short-term errors and in the case of the former shifts the compensator mechanism from one nominal position to a new nominal position.

Other objects and advantages of the invention will hereinafter appear.

DESCRIPTION OF A PREFERRED EMBODIMENT

Figure 1:
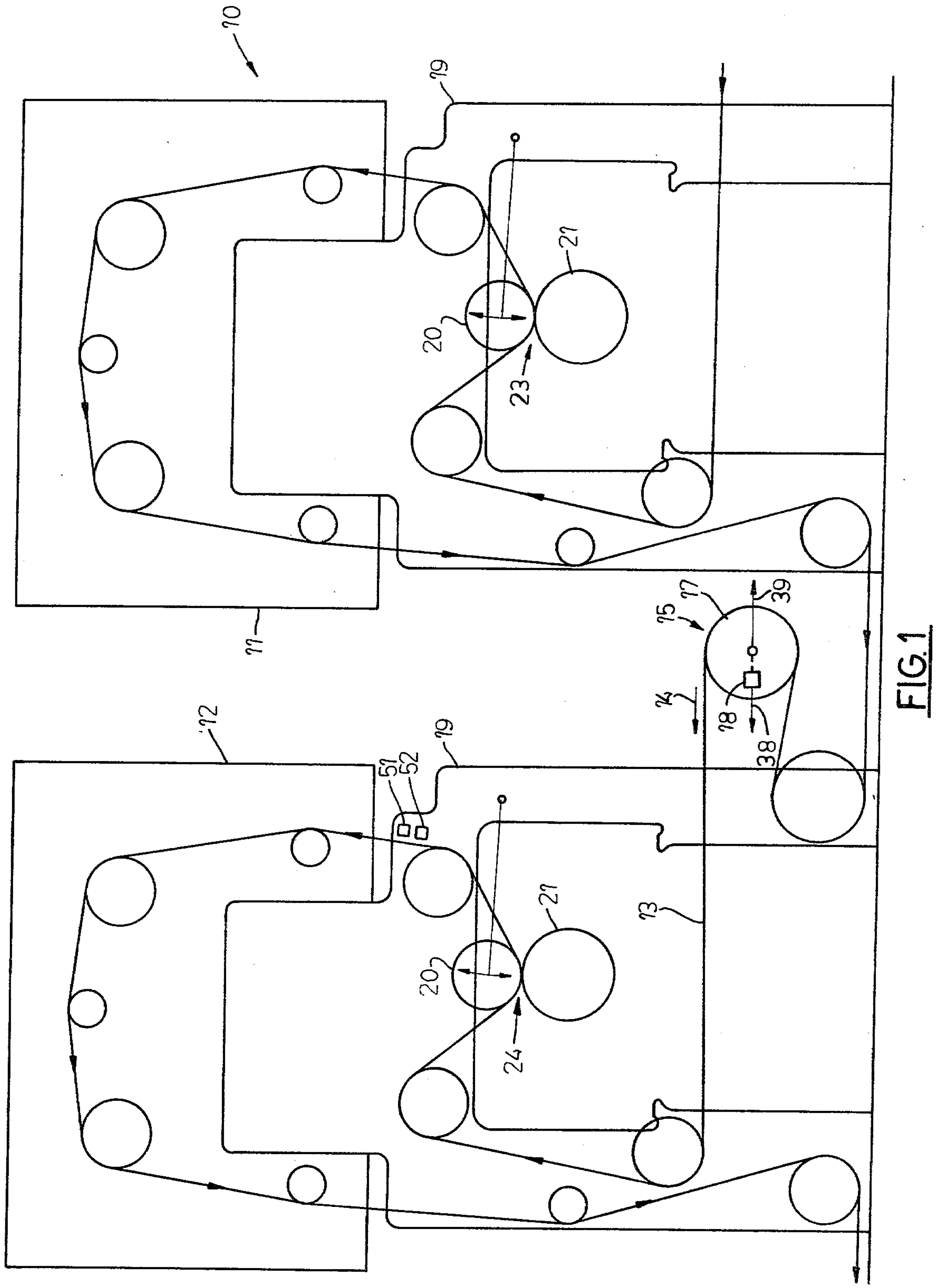
FIG. 1 is a schematic end view of two successive printing decks of a printing press with a web compensator mechanism therebetween.

FIG. 1 schematically shows a portion of a web processing apparatus, such as rotogravure color printing press 10, with which a register control system in accordance with the invention is advantageously employed. Press 10 comprises successive spaced apart printing decks 11 and 12 through which a continuous web 13, such as paper, paperboard, or foil, passes in the direction of arrow 14. A web compensating mechanism 15 is located between decks 11 and 12 and includes an adjustably movable compensator 17, in the form of a roll, which engages the changes web length and a servo-drive motor 18 which moves compensator roller 17 to effect web compensation, i.e. a short-term application of longitudinal strain on the web 13 for the purpose of accurate registration. Instead of the web compensating mechanism 15, however, a cylinder compensating mechanism of the type schematically shown in FIG. 5 may be employed. Each deck comprises a framework 19 and a rotatably driven etched printing or gravure cylinder 21 and an impression roll 20 which holds the web 13 against the gravure cylinder. Each deck also comprises other rollers (unnumbered) which guide the web 13 therethrough. The cylinder 21 and roll 20 define a nip, i.e., a line along which the web 13 is gripped, and the nips in decks 11 and 12 are designated respectively, as the preceding nip 23 and the succeeding nip 24. The term "web length" as used herein refers to the length of the web between the nips 23 and 24 and this length varies with the position of the web compensator 17 and the repeat length. Repeat length is one impression or copy and corresponds to the circumference of the gravure cylinder 21.

Figure 2:
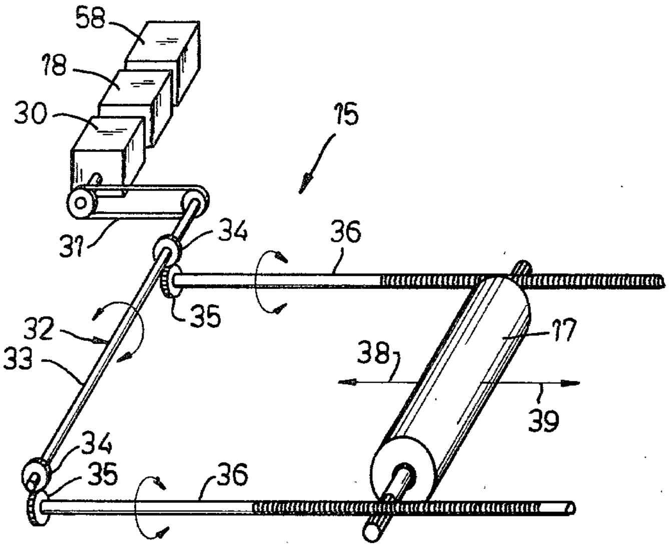
FIG. 2 is a perspective view of the web compensator mechanism of FIG. 1.

As FIG. 2 shows, web compensating mechanism 15 specifically comprises, in addition to compensator roller 17 and motor 18, a gear reducer 30 which is driven by motor 18 and connected by means of a belt drive 31 and a right-angle worm gear drive set 32 to compensator 17. Set 32 comprises a drive shaft 33 having gears 34 thereon which engage gears 35 on lead screws 36 which are connected to effect movement of compensator 17 in advance (arrow 38) and retard (arrow 39) directions.

Figure 4:
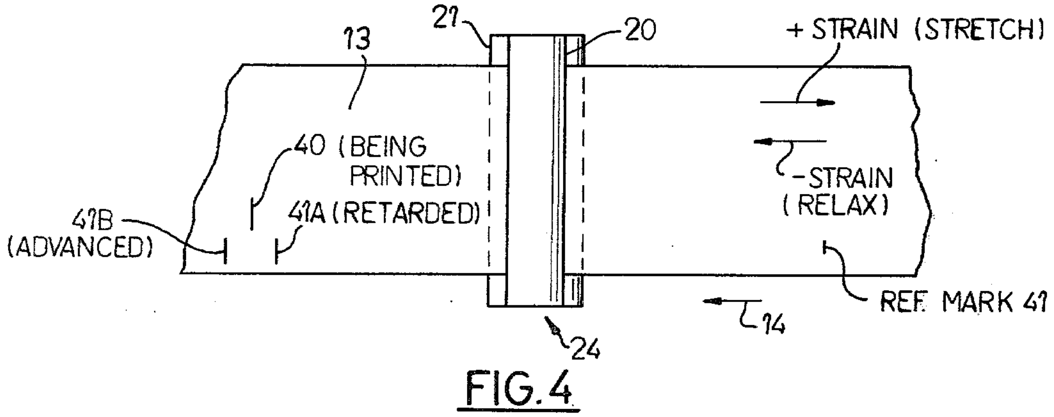
FIG. 4 is a schematic top plan view of the components shown in FIGS. 3 and 4.
Figure 3:
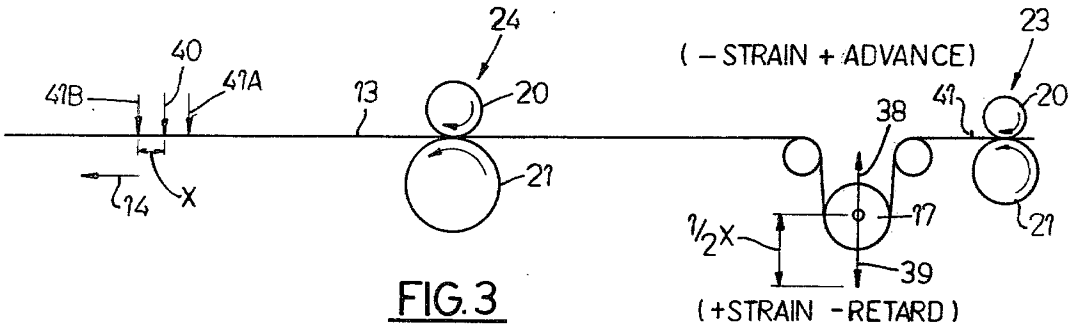
FIG. 3 is a schematic side view of a web, roller couples and a web compensator.
Figure 5:
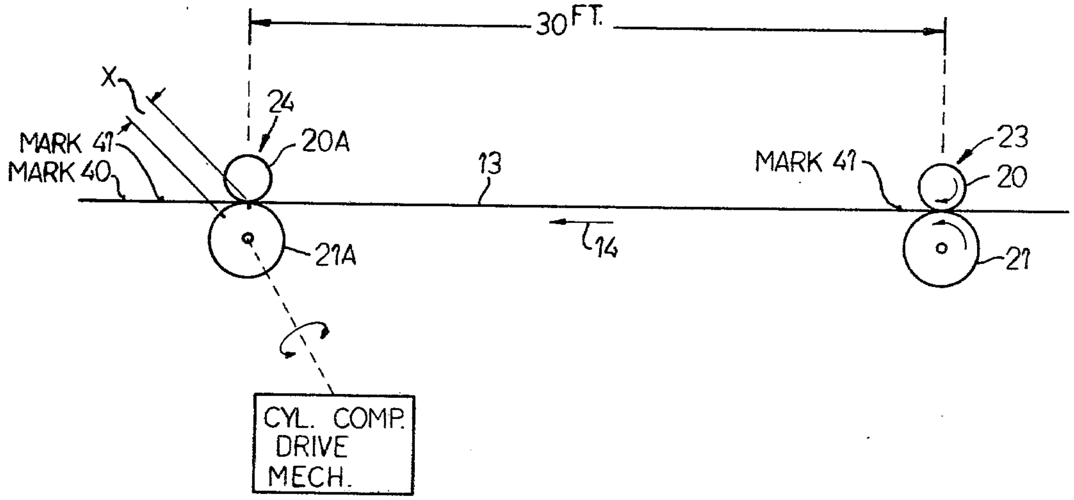
FIG. 5 is a schematic side view, similar to FIG. 3, of a web, roller couples, and a cylinder compensating mechanism.

As FIGS. 3, 4 and 5 show, the web compensation or cylinder compensation principle relates directly to the elastic characteristics of the web 13. It is this property that allows one to position a mark previously printed 41 (41A or 41B) on the web 13 with respect to a mark 40 that is being printed. Since there is no web slippage at the gravure nips 23 and 24 in web compensation, the web compensator 17 is employed to strain the web 13. As FIG. 5 shows, however, in cylinder compensation, the cylinders 20A and 21A are angularly shifted relative to the web to impose a strain on the web. It is this momentary change in the longitudinal dimension (web length) or strain of the web 13 that accomplishes registration.

By definition, as a positive strain is applied to the web 13 by the compensator 17, the previously printed mark 41A is retarded with respect to the mark being printed 40. Conversely, as a negative strain is applied, the previously printed reference mark 41B is advanced with respect to the mark being printed 40. Reference mark 41A is retarded with respect to the mark 40. As the web entering the nip is relaxed, the reference mark advances toward position 41B. The position of the mark 40 does not change, only the position of the reference mark (41A or 41B) changes. The designations "advance" or "retard" refer to the operation of the controls to effect the indicated web movement.

During compensation, the web tension between the gravure nips 23 and 24 changes momentarily. Since the compensator velocity is always proportional to the web speed, the web tension or stress change is limited to about 10 percent of the established level. These web tension changes are an indirect result of compensator mechanism position change. Therefore a definite compensator mechanism position is established for any given register error independent of web characteristics.

The application of an electronic register control for servo-motor 18, as hereinafter explained, enables one to accurately obtain a specific position for the compensator roll 17 to establish its proper short-term web strain position and long-term position.

By applying the basic principles of stress/strain relationships in accordance with the invention and the technique of positional servo-control, web compensated print-to-print registration can be accomplished.

Figure 6:
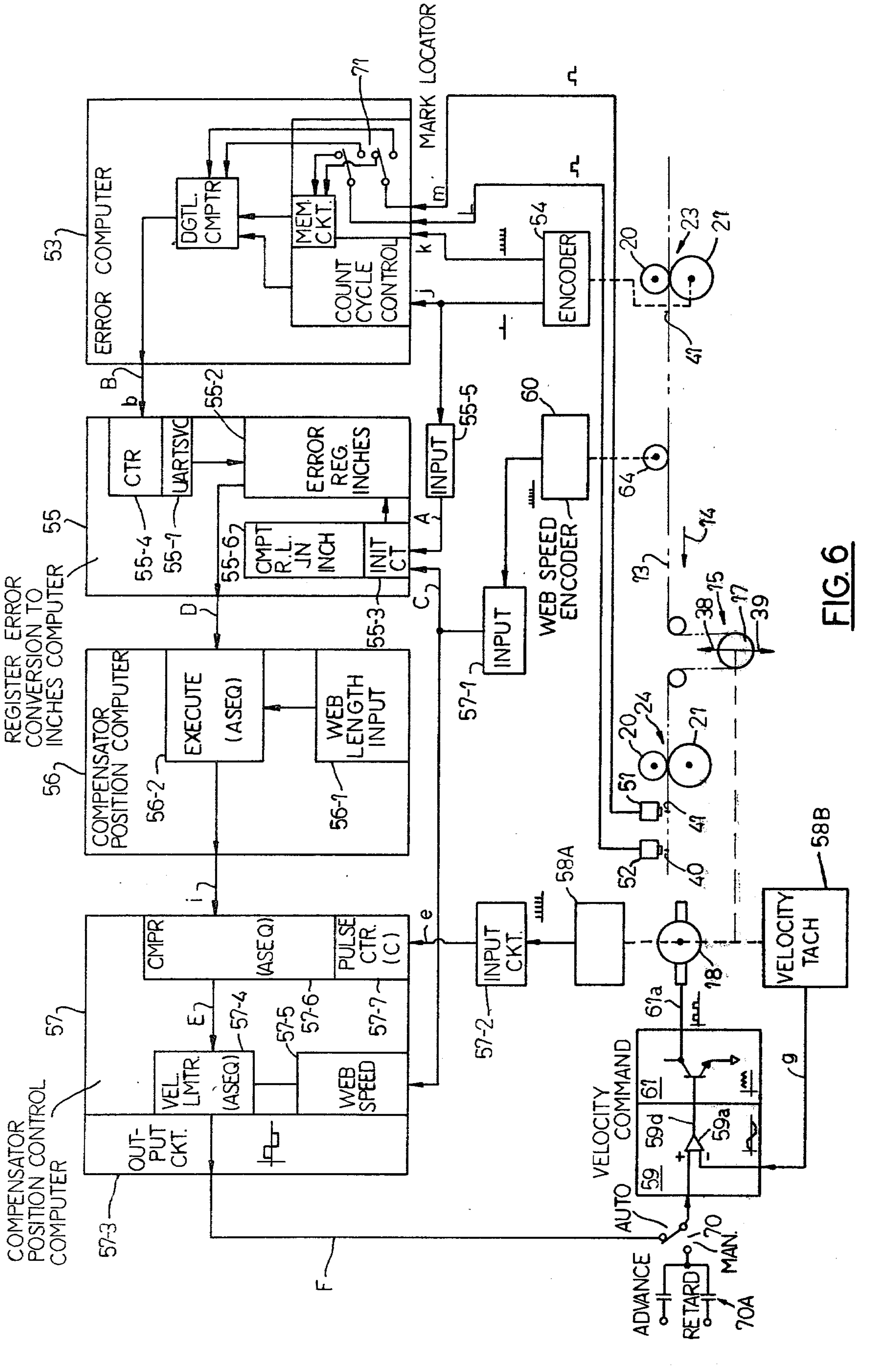
FIG. 6 is a schematic diagram of a register control system in accordance with the invention.

FIG. 6 is a schematic diagram of a register control system for rotogravure color printing press 10 which includes the adjustably positionable compensator mechanism 15 for adjusting web length between the successive printing nips 23 and 24 to correct for registration errors. The register control apparatus employs the principle that there is a predetermined position of the compensator mechanism for any given length of web wherein register error is eliminated. The register control apparatus, which is initially provided or programmed with electronic signal information representative of web length and compensator mechanism position (null position) wherein no registration error occurs, also includes electrical devices and circuitry for sensing and electronically processing incoming signal information relative to web speed; direction, magnitude and rate of registration error; and change of position of the compensator mechanism 15. The register control apparatus performs computing operations on the programmed signal information and incoming signal information and provides an output signal which locates the compensator mechanism in a position wherein register error is eliminated. The computing operation includes: ascertaining the proportion between the register error and compensator mechanism position; ascertaining the derivative (i.e., relationship) between the rate of change of register error and the rate of change of compensator mechanism position; and integrating to establish the average magnitude of register error and relating it to the average (optimum) position requirement of the compensator mechanism.

Figure 6A:
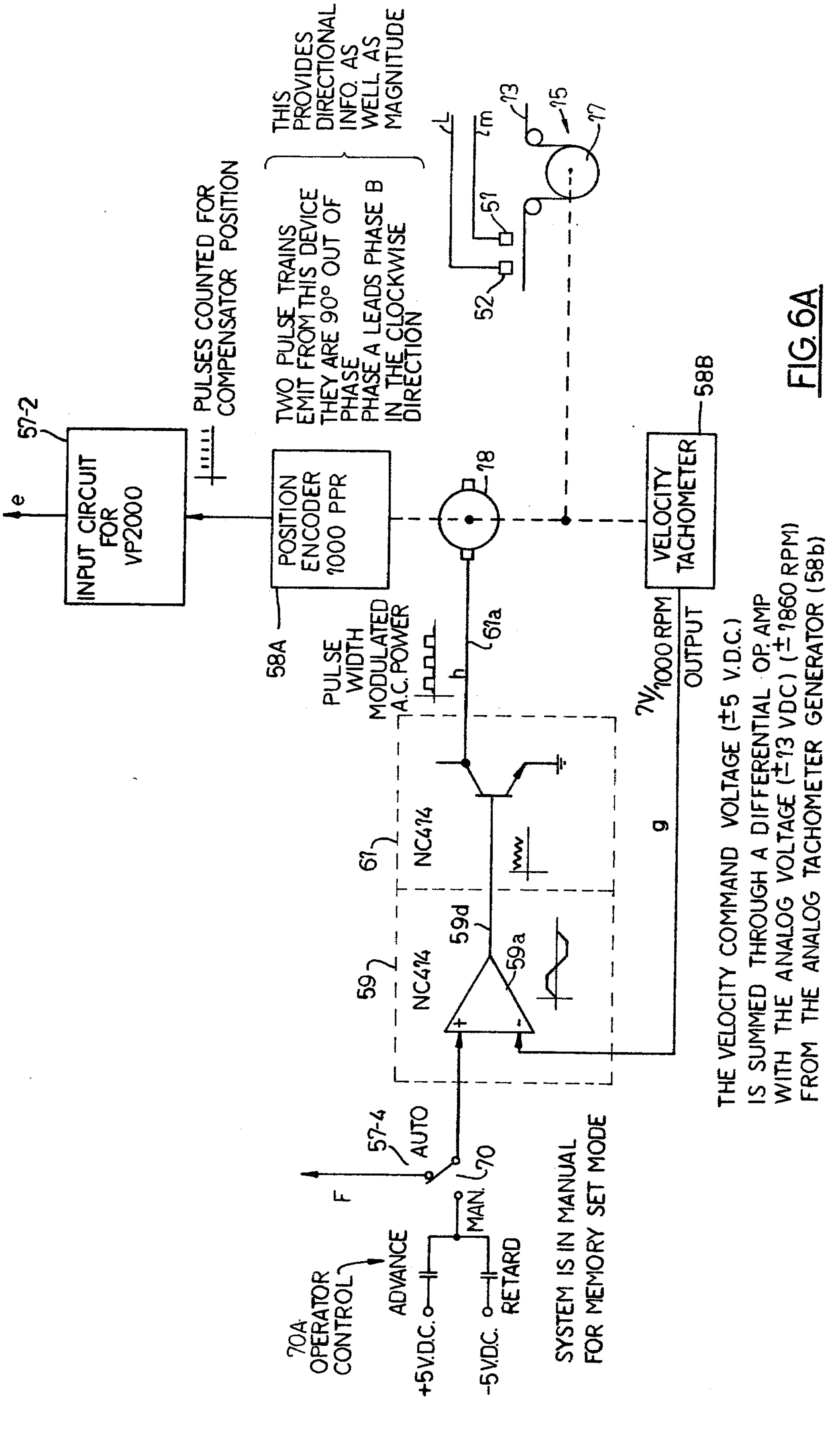
FIGS. 6A, 6B, 6C and 6D are enlarged and more fully annotated depictions of portions of the schematic diagram of FIG. 6.
Figure 6B:
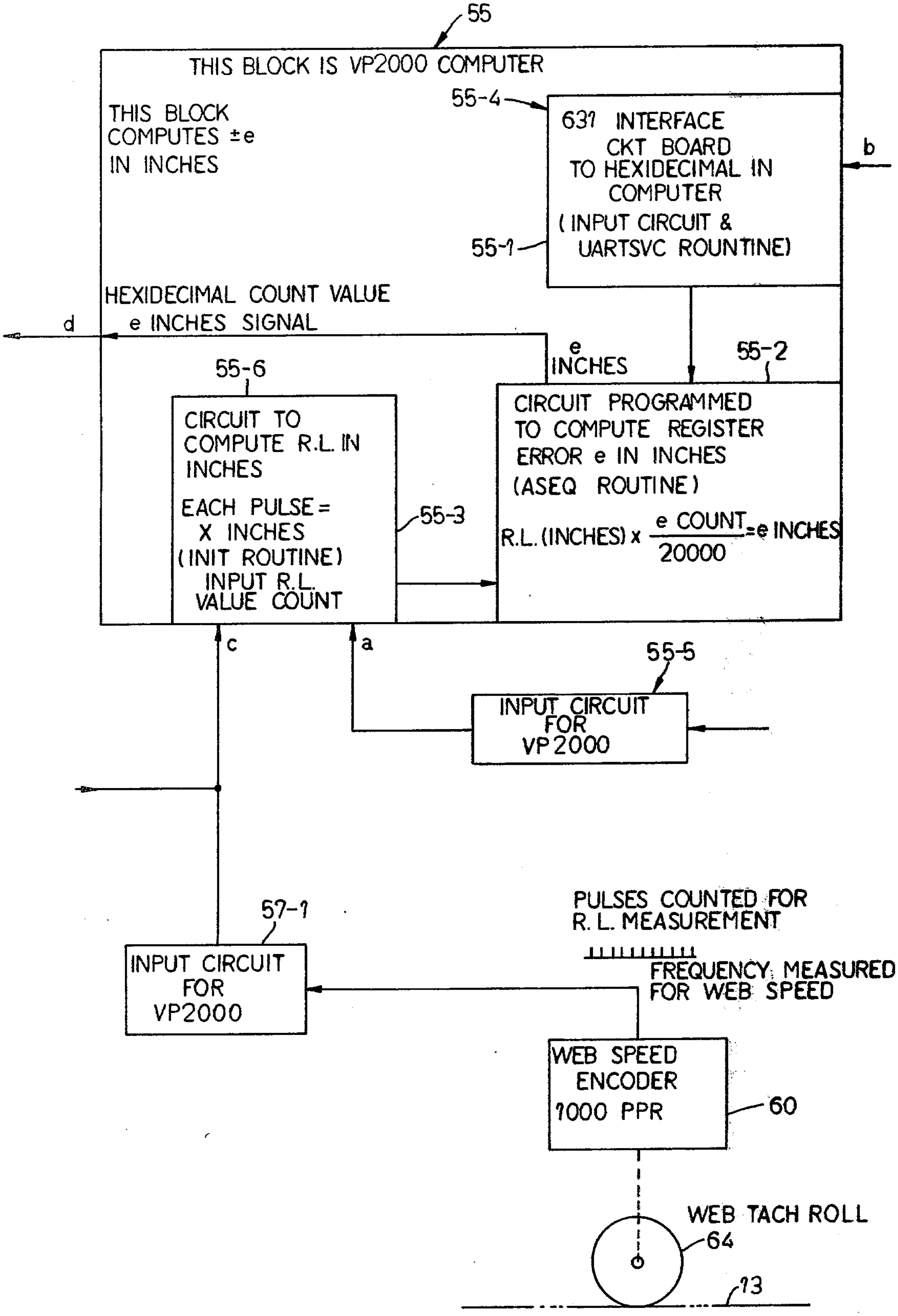
Figure 6C:
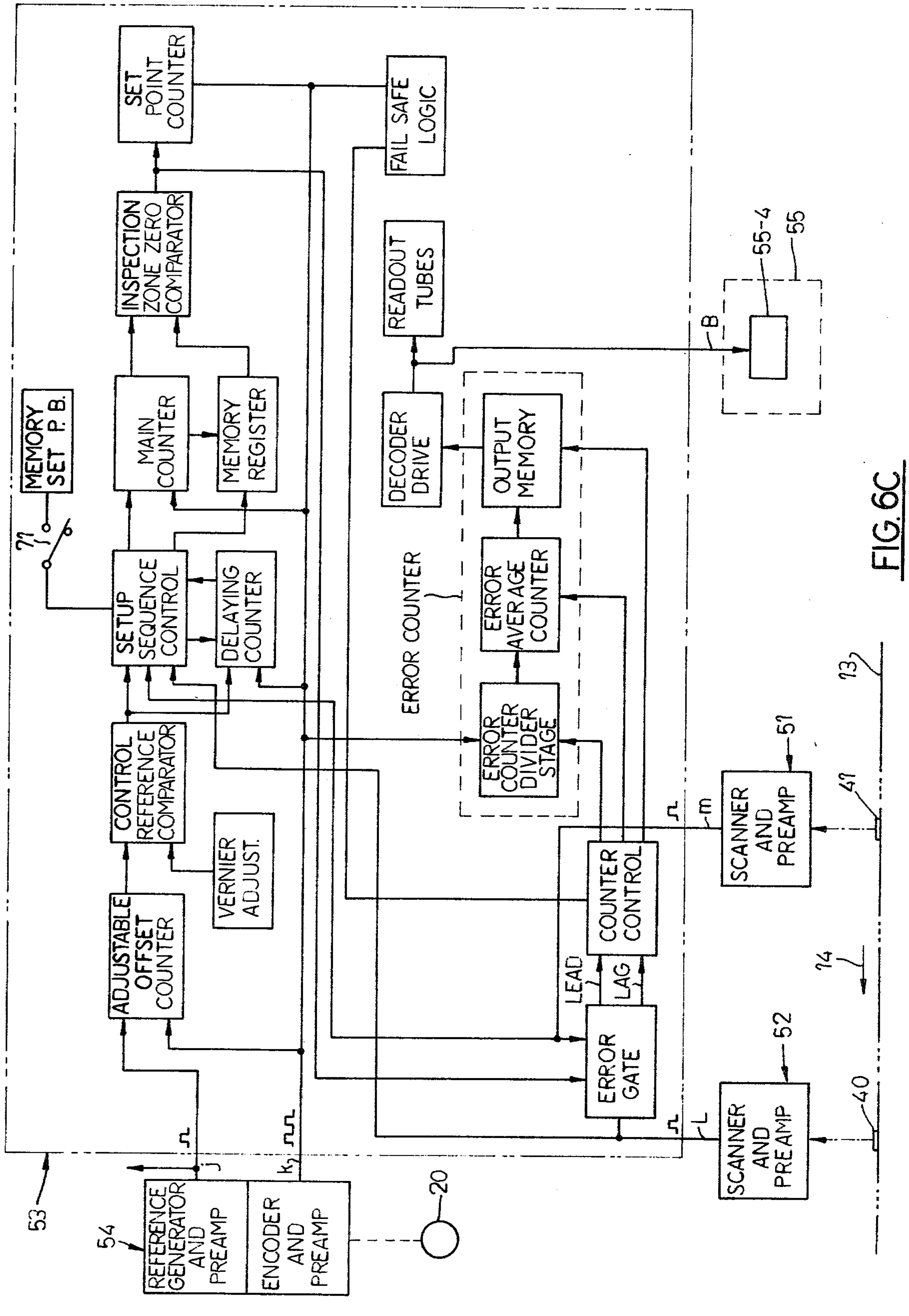
Figure 6D:
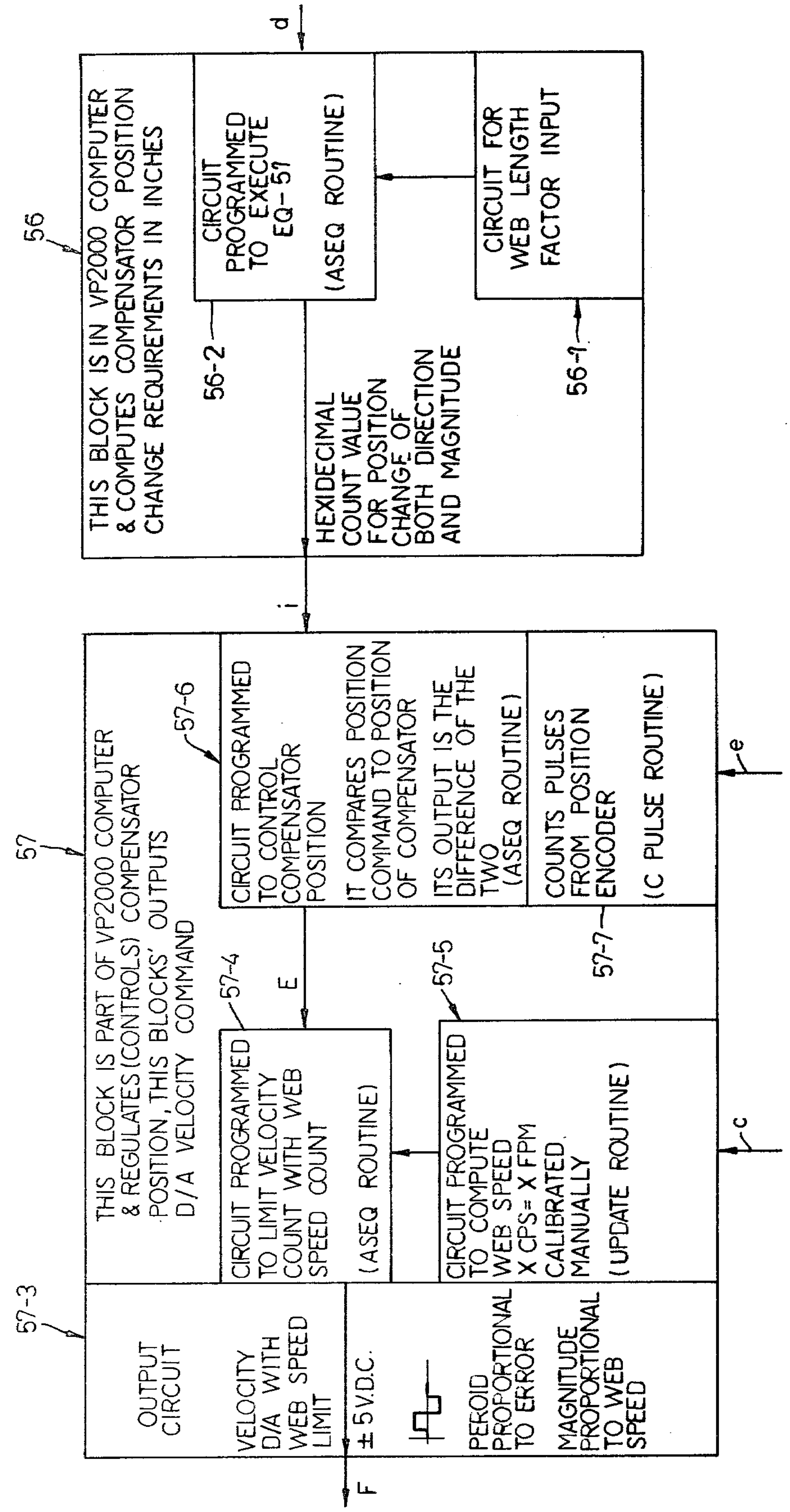

More specifically, FIGS. 6 and 6C show that the register control system comprises two web scanners 51 and 52. Scanner 51 senses the previously printed color location mark 41A or 41B which is indicative of a preceding color placement on the web 13 and provides location signals to a mark location comparator 53. Mark location comparator 53 compares a mark location from scanner 51 to the signal from scanner 52 which senses the mark 40 being printed. That difference signal is compared to a programmed location for the two marks. As FIGS. 6 and 6C show, the system also comprises a cylinder angular velocity/position transducer 54 which provides a basis for retaining the programmed mark location requirement. This programmed mark location requirement is a memorized count value that is the pre-programmed required relationship between the two marks that are scanned by scanners 51 and 52. As FIGS. 6 and 6B show, a mark location scalar and vector computer 55 is provided to scale the mark change in location into a unit of linear measurement in magnitude and direction. Computer 55 provides a series of binary pulses that are counted in one direction or another to determine the direction of the register error and magnitude of register error. This pulse count is stored on a continuing basis. More specifically, the relationship between the two marks is counted in pulses and stored and compared to a previously established compensator position requirement. The difference between previous position requirements and the current output from the error computer 55, indicative of a register error, is a signal comprised of a magnitude component and a direction component. As FIGS. 6 and 6D show, a compensator position computer 56 is provided to translate the change in mark location into a compensator position change requirement, as a function of compensating web length. The error count (a binary count) represents magnitude and direction of register error and is converted to a binary coded decimal (BCD) indication or display signal for the operator. The binary signal value is translated to a hexadecimal value and is used to compute the required compensator position change. As used herein the term hexadecimal means a series of counts 1 to 16 that the computer program uses because it is more convenient and accurate to manipulate numbers with that number base. As FIGS. 6 and 6D show, a compensator position regulator 57 is provided to command and control a compensator position change which will return the mark to its location requirement. More specifically a digital signal provides digital counts which are used to position the compensator regulator and these counts are matched by the counts that are received from the velocity/position transducer 58 for the purpose of determining what the actual movement of the compensator is relative to the command. As FIGS. 6, 6A and 6D show, a compensator velocity/position transducer 58 is provided to provide scalar and vector information of compensator velocity and position. Transducer 58A provides digital pulse signals which indicate the position change of the compensator 15 from its initial nominal position. As a practical matter, in operation, the range of corrective movement of the compensator 15 in inches would be typically on the order of 30,000 of an inch, although the total possible movement of the computer can be up to about 40 inches for set-up of press to establish initial web length. A compensator velocity regulator 59 is provided to command a velocity of compensator speed which is proportional to web speed and to position error. The compensator velocity regulator 59 receives input signals and provides an output signal at **59*d*. Signal 59*a*** is signal proportional to web speed. Signal F is a digital to analog converted signal of plus and minus value, such as zero to five volts, and represents the velocity command from the position regulator 57. Signal g represents an analog signal which is proportional to the velocity of movement of the compensator 15. The output signal 59*d* is an analog signal that commands the motor control power unit 61 to provide power to the DC motor 18 which moves the compensator 15. The combination of signals c and F comprise one signal F which is compared to the signal g. The combination of two signals provides the velocity regulator 59 with analog information of the velocity error between its command F and its feedback signal g. A web speed transducer (i.e., a tachometer) 60, responsive to web speed at roller 64, provides a signal to maintain the compensator velocity proportional to web speed. The position regulator velocity command signal F is a function of register error and web speed. The web speed signal is provided by the web speed transducer 60 and takes the form of digital pulse information that is frequency related to and representative of the speed of the web. A motor control amplifier 61 is provided to amplify the low level control signal from velocity regulator 59 to motor 18. Motor 18 converts amplified signals into mechanical motion of compensator 17. The web compensator mechanism 15 thus imparts longitudinal strain to the web 13 in a tensive direction of varying magnitudes, the result of which is to relocate the preceding previously printed color location mark 41. The effect of imparting longitudinal strain on web 13 is a result of compensator movement and has the effect of stretching the web 13 between the pair of roller nips 23 and 24. As the web is stretched, the effect is to retard the position of the previously printed mark 41A with respect to the mark 40 being printed. The purpose of imposing strain is to effect an immediate change in the registration from the preceding mark 41A to the mark 40 being printed. After a period of time, when all web between the pair of spaced apart nips 23 and 24 is replaced by a new web, the resulting displacement in the color (mark) placement is permanent, even after strain or stretch imparted to the web goes away. In an alternative embodiment shown in FIG. 5, when using an adjustable roller to achieve web compensation, the effect of the angular shifting of the rollers 20A and 21A is to stretch the web but there is no web slippage relative to the rollers.

The method of registration error calculation involves comparing a calibrated number of encoder pulses to successive pulse inputs. The reference-to-mark calibration method uses the zero reference signal to start the pulse count and the sensed color mark to stop the count. Any deviation from the calibrated count is register error. This "BCD" error magnitude must be converted, by the control, to inches of error based on the repeat length calculation.

The scaled signal must be further compared and conditioned. The error in pulse counts has "high" and "low" frequency components associated with it. The high frequency variations (0.5–8.33 HZ) are to be filtered out based on their amplitude and frequency. When a significant difference in error occurs there is to be no velocity command issued. If the error returns to a value below the "impulse limit" with the next impression the auto compensation will resume. If, however, the error remains above the limit after four impressions, auto operation must then resume (as the error may no longer be considered transient).

Figure 12:
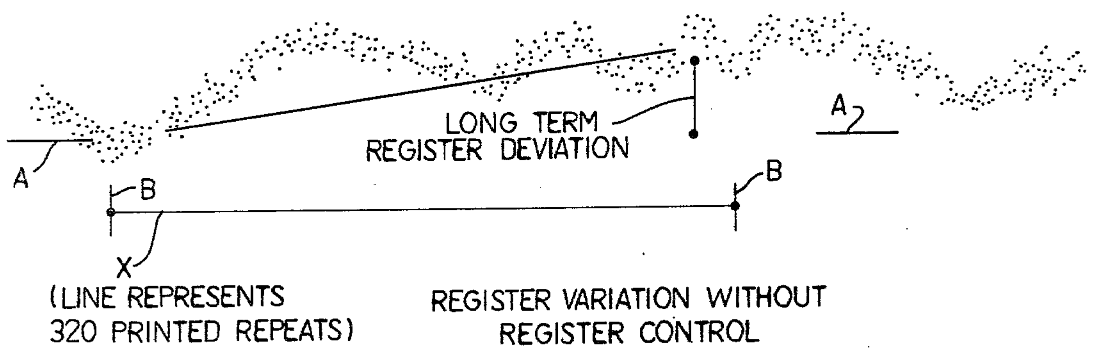
FIGS. 12, 13 and 14 show register charts recorded during operation of presses having various types of register control systems.
Figure 13:
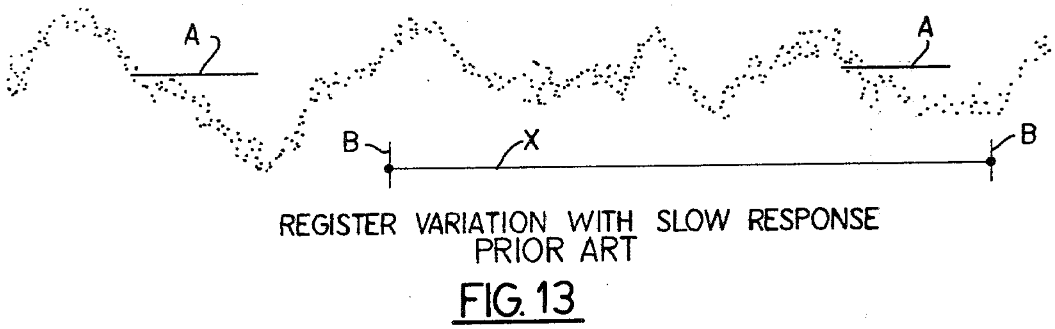
Figure 14:
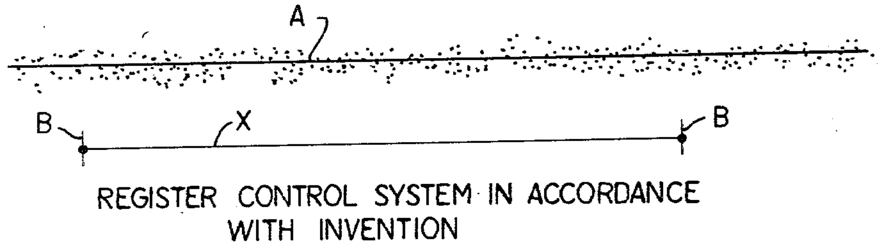

FIGS. 12, 13 and 14 depict actual color register charts recorded during three production runs and under identical conditions. These charts show the register of two colors during production at a web speed of 400 feet per minute. The heavy horizontal line A indicates zero register. Each small division indicates one thousandths of an inch. Each "blip" or dot indicates the register reading of one imprinting. There are 320 imprintings recorded between each heavy vertical line B. FIG. 12 shows register variation without register control. FIG. 13 shows register variation with slow response, as in existing prior art systems. FIG. 14 shows register variation with a register control system in accordance with the present invention.

Figure 15:
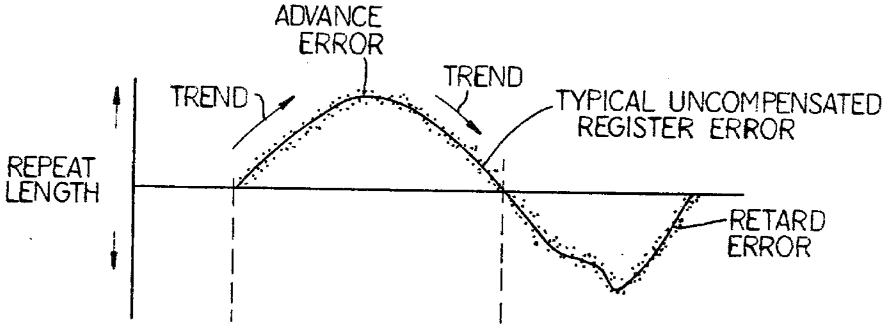
FIG. 15 is a graph which depicts the cyclical nature of register error.
Figure 16:
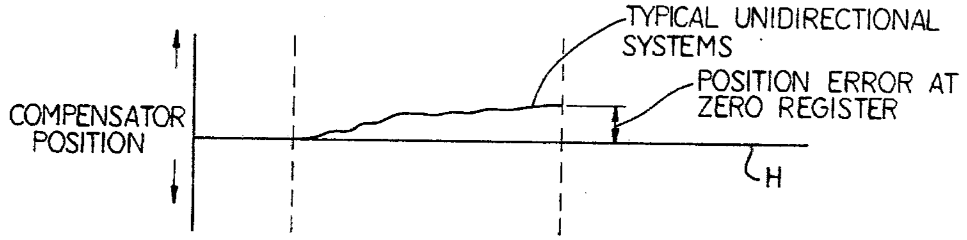
FIG. 16 is a graph which depicts register error correction in accordance with a prior art system.
Figure 17:
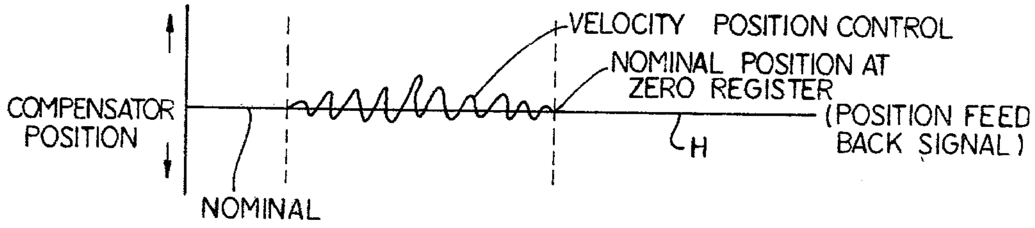
FIG. 17 is a graph which depicts register error corrections by a system in accordance with the invention.

FIGS. 15, 16 and 17 are graphs which depict the cyclic nature of register error in a rotogravure press on a short term basis. The curve in FIG. 15 is a typical cyclic register depiction and relates the random variation in printed repeat length relative to time. The two curves in FIGS. 16 and 17 represent compensator movement related to time for register errors of the type shown occurring in the curve of FIG. 15.

As FIG. 16 shows, typical prior unidirectional control compensator motors can move only in one direction relative to horizontal reference line H for a given polarity of register error. The result is that as the register polarity crosses over, the compensator is in the wrong position at zero register. It is this factor that requires that unidirectional control systems operate with very slow response.

As FIG. 17 shows, the velocity/position register error control system in accordance with the invention has the capability to move the compensator roller 17 in either direction (above or below reference line H) for any given polarity of register error. This is accomplished as a result of sensing the register error trend as shown in the curve in FIG. 15, as well as providing for the compensator position. Thus, a system sensing the register trend, actual register error, and computing positional change requirements is constantly capable of returning to the nominal position irrespective of register polarity. This capability permits high compensation rates, for example, five inches of web compensation per minute, which is a factor of at least ten times greater than some existing controls.

Figure 18:
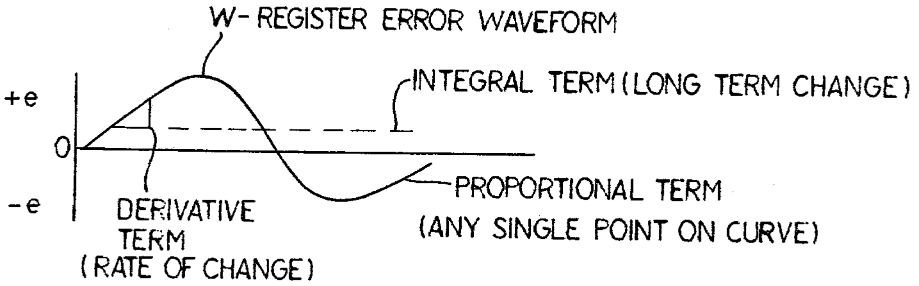
FIG. 18 is a graph depicting a register error wave form and identifying particular locations therein which are analyzed by a register control in accordance with the invention.

As FIG. 6 shows, the control system includes means for providing proportional, integral, and derivative command signals to the compensator 15, as a function of the wave form of the BCD register error input signal. The mathematical representation of this position command is explained below. The graph in FIG. 18 shows a wave from W representing a register error and the derivative, integral and proportional terms (labelled in FIG. 18) referred to herein are discussed relative to that wave from W.

The equation that represents the position command is: (EQ-1) position command, $$P = A_0 e + A_1 \frac{de}{dx} + A_2 \int^{t} e\,dt$$

Where:

P = Position command in inches
e = Register error in inches
x = Repeat length in inches
t = Time in seconds
$A_0\, e_1$ (inches) = proportional command $$\frac{A_1 (e_1 - e_o)}{x} \text{ inch} = \text{derivative command}$$

$$\frac{A_2 [e_o + e_1 .. + e_n \text{ (in.)}]}{N} = \text{Integral command}$$

The repeat length refers to the circumference of the gravure cylinder 21. It is a variable that must be computed each time a new set of gravure cylinders 21 is placed in the press. The method employed is to first measure the linear speed of the web 13 and then divide by the impression rate. (EQ-2) Repeat length=x=Web speed (IN/SEC)/Impression Speed (RE/SEC)

Therefore:

$$x = \frac{V \text{ web in/sec}}{W \text{ cyl. Rev/sec}}$$

$x$ = Repeat length (inches)

The web speed measuring tachometer 64 is located on the web 13 for this purpose. In regard to equation (EQ-1), the proportional gain ($A_0$), derivative gain ($A_1$), and integral gain ($A_2$), values are required to be fully independent and adjustable.

Figure 20:
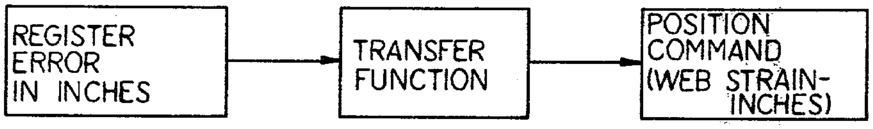
FIG. 20 is a schematic diagram depicting in elementary fashion the function performed by a register control in accordance with the invention.
Figure 21:
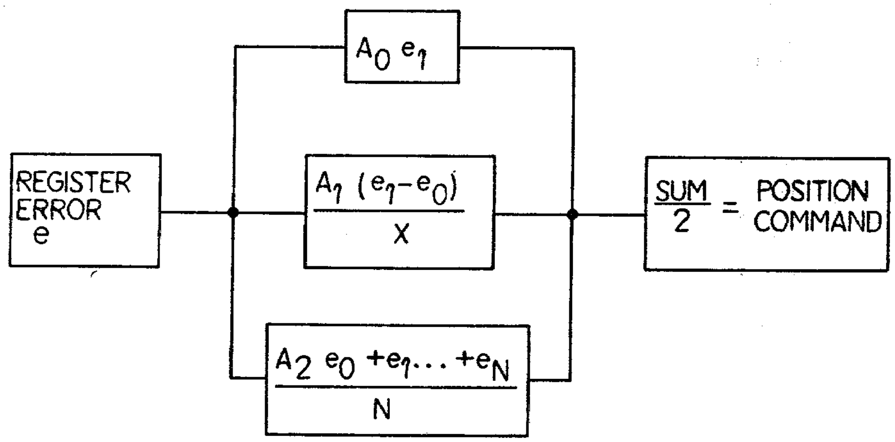
FIG. 21 is a schematic diagram depicting a simplified electrical circuit for implementing a mathematical algorithm of a register control system in accordance with the invention.

As an aid in understanding the present invention, the register control may be considered as performing a transfer function according to the block diagrams shown in FIGS. 20 and 21 and in accordance with the analysis of FIG. 18. The transfer function is comprised of three terms (see FIG. 21) which, when summed, become the position command.

Where:

$e_1$ (inches)=existing register error $e_0$ =previous register error x=repeat length (inches)

$A_0 e_1$ (inches)=proportional command $$\frac{A_1 (e_l - e_o) \text{ inch}}{x} = \text{derivative command}$$

$$\frac{A_2 [e_o + e_1 .. + e_n \text{ (in.)}]}{N} = \text{Integral command}$$

Therefore the general equation for the position command is:

$$\text{Web Strain (inch)} = A_o e_l \text{(inches)} + A_1 \left( \frac{e_l - e_o \text{ (inch)}}{X} \right) + A_2 \left( \frac{e_o + e_l .. e_n \text{ (in.)}}{N} \right) \quad \text{(EQ-3)}$$

The gain constants $A_0$, $A_1$ and $A_2$ have been introduced here by realizing that the ultimate system response is a function of the length of web that the web compensator must control. This web length factor is the nip-to-nip web length less the web resistence of the idler rolls it contacts. By analysis it has been found that the derivative gain ($A_1$) is large in magnitude compared to the other two ($A_0$ and $A_2$).

The practical maximum gain for $A_1$ is the web length in inches from nip-to-nip and this must be expressed in the same unit distance by which the derivative term is computed. For example, $A_1$=Nip-to-Nip web length=384 inches is typical.

The maximum gain for $A_0$ and $A_2$ would be the theoretical value of 1 (one). In practice, these gains are varied for system stability and usually are less than unity gain.

$A_1$ presents itself as the most significant factor for determining the ultimate performance of the register control system. This is true because register errors are always changing in a sinusoidal pattern, as FIG. 18 shows.

The control system performs the transfer function and positional control on each repeat length. The repeat length and the web speed define the time period of position control, because the error is sampled once per repeat. Each time the web compensator 17 moves, the registration error wave form changes (i.e., as regards slope and magnitude). It would be impractical to attempt to predict the required compensator position between the sample periods for each repeat length. As a result the nature of this servocontrol is incremental, in that it can only compute a position command once per repeat length. It is impractical to attempt programming it to anticipate error trends between repeats. Therefore, in practice, the operation of this control system is limited by the fact that the register error is sampled once per repeat length; that is, the control must assume that, having computed a position command, error causing conditions do not change significantly from one repeat length to the next. This is a valid assumption based on actual field testing. The largest error recorded in field testing was 0.001 of an inch per foot of web. Therefore, the present control would allow the worst case error of 0.003 inch in a longest typical repeat length of 36 inches. The nominal register error was recorded during field testing was 0.0002 inch/foot.

Figure 19:
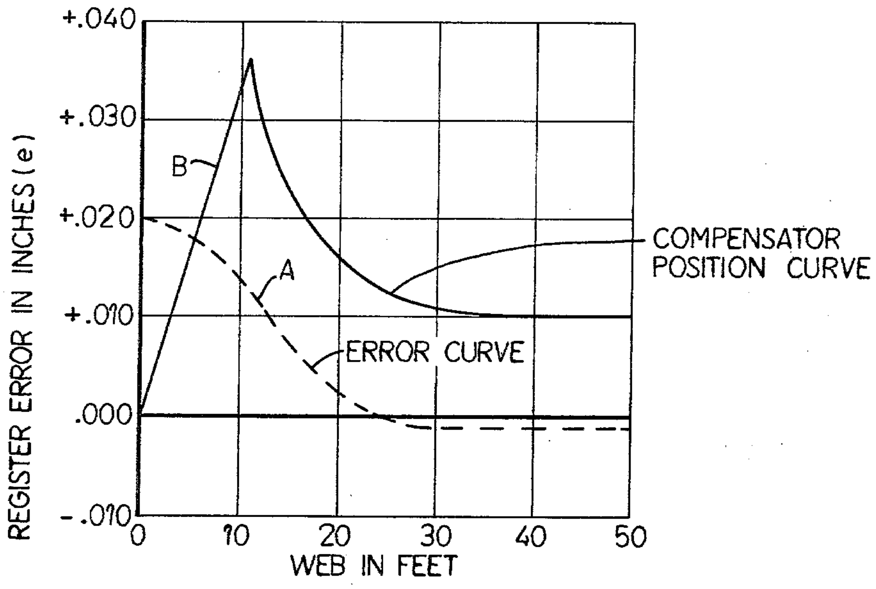
FIG. 19 is a graph depicting the relationships between web length, register error magnitude and compensator position.

In graphical form the result of a properly implemented transfer function will take the form of that illustrated in FIG. 19, A large step error is shown to illustrate compensation under magnified conditions. In the graph shown in FIG. 19 wherein feet of web is plotted against register error in inches, the curve A depicts the register error per unit feet of web passing through the printing roller as was described before. Curve B depicts the position change in inches of the compensator relative to the sheet of web passing through the printing roller. The graph in FIG. 19 depicts the proper function of a compensator such as 15 which will reduce the initial register error to zero in as short a time as possible.

By taking into account one more variable, which is the wrap angle of the web 13 on the compensator roll 17, as being a constant of 180°, the actual transfer equation can be expressed as:

$$\text{Position command (inch)} = \frac{A_o e_l \text{(inches)} + A_1 \left( \frac{e_l - e_o \text{ (inch)}}{X} \right) + A_2 \left( \frac{e_o + e_l ... e_n \text{ (inch)}}{N} \right)}{2} \quad \text{(EQ-5)}$$

By substitution from equation (EQ-3) we obtain:

$$\text{Position command (inch)} = \frac{\text{Web strain (inch)}}{2 \text{ (for 180° wrap angle)}} \quad \text{(EQ-5A)}$$

A functional representation of the algorithm as implemented by an electronic circuit is shown in FIG. 21 and should be considered in conjunction with equation (EQ-5 and EQ-5A).

OPERATION

Referring to FIG. 6, the initial conditions for operation assume that the control system is set in the manual mode and the register error measurement control is set in the memory set mode. The memory set mode establishes the physical relationship between mark 40 and mark 41. The digital pulse signal L from scanner 52 generated by mark 40 enters into the circuit block 53 on signal line e.

The pulse generator signal M from scanner 51 generated by mark 41 enters into the circuit block 53 on signal line m. The relationship between mark 40 and mark 41 is recorded and stored in the memory to later be compared to the ongoing relationship sensed relative to the continuous repeat of mark 40 and mark 41. In the memory set mode the compensator 15 is jogged into position by means of a manual advance and retard pushbutton 70A under operator control. While the press 10 is running at a low production speed, the compensator 15 is jogged to an initial position to establish the desired relationship between mark 40 and mark 41. Once this occurs the control is switch to automatic control (70) and the error measurement counter is switched to the automatic mode (71).

Figure 7:
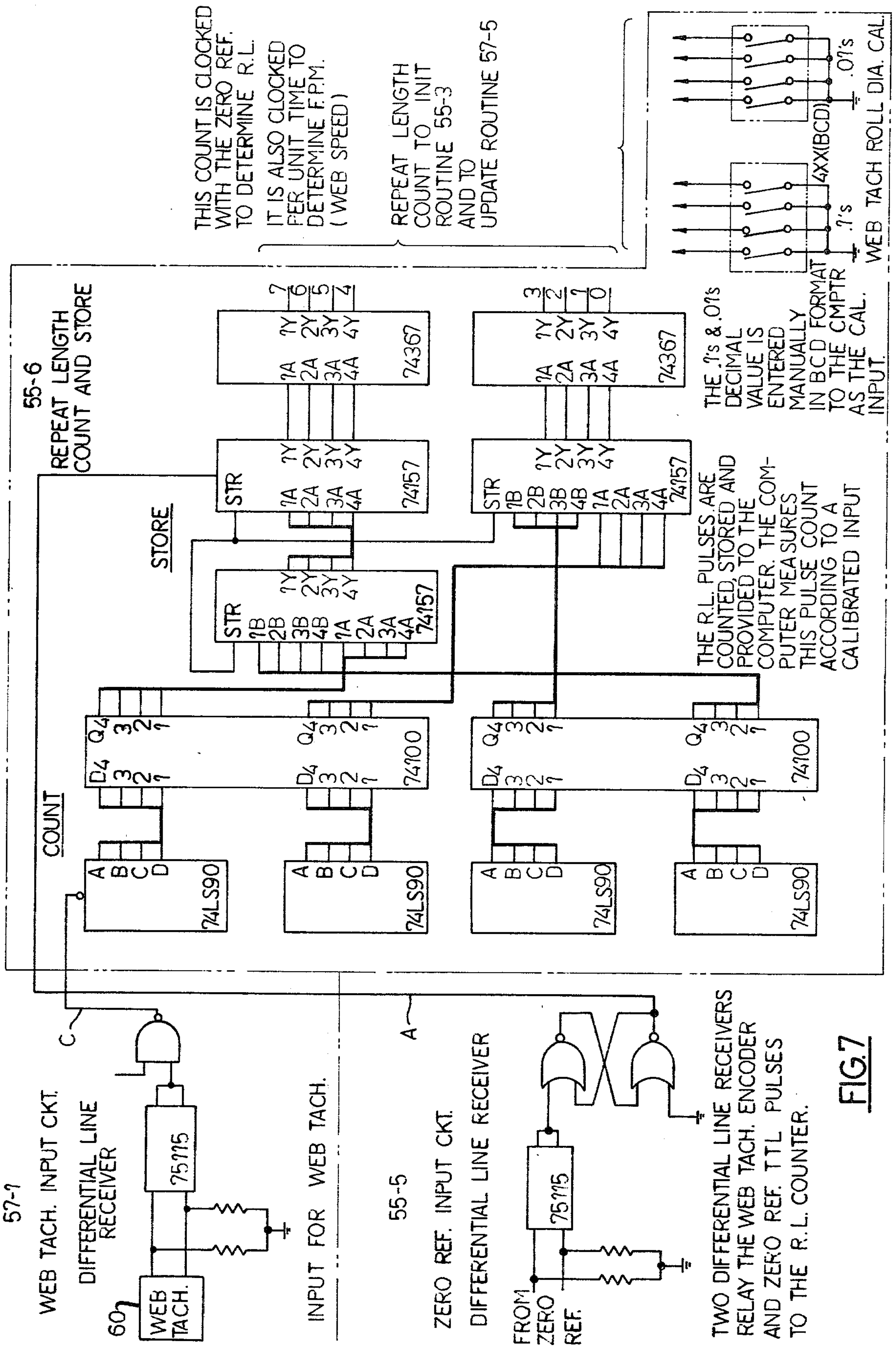
FIGS. 7, 8, 9, 10 and 11 are more detailed electrical circuit diagrams of portion of the circuits shown in FIGS. 6, 6A, 6B, 6C and 6D and correspondingly labelled.
Figure 8:
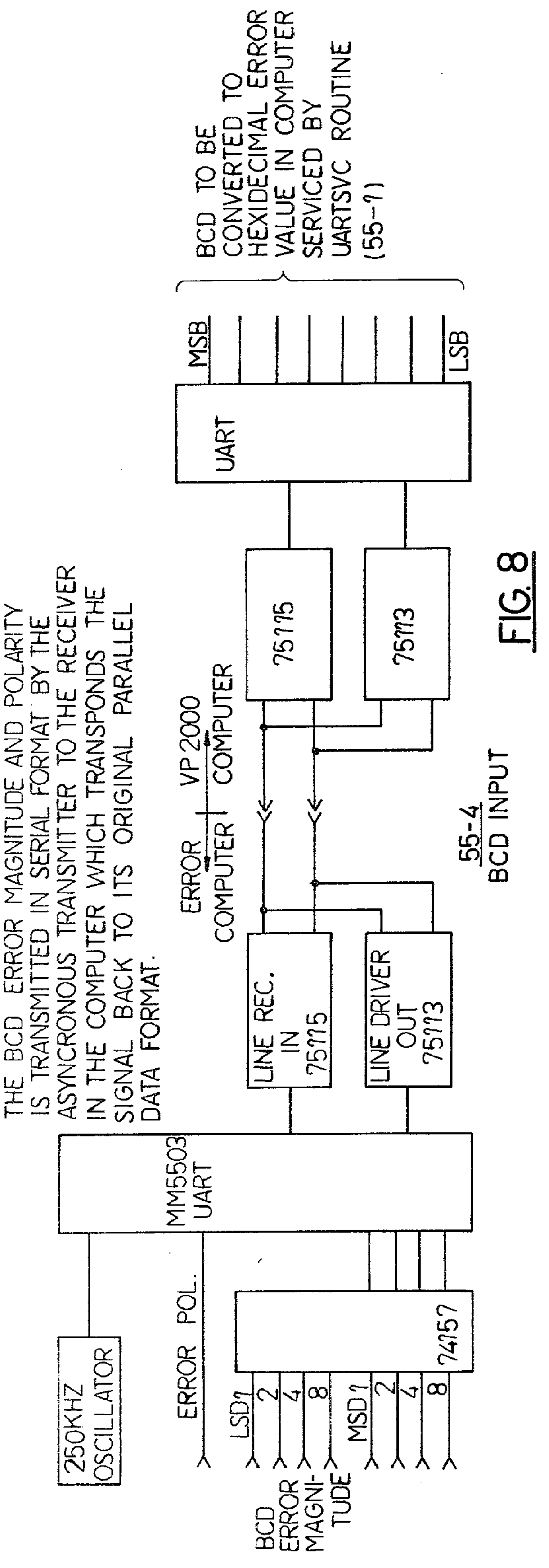
Figure 11:
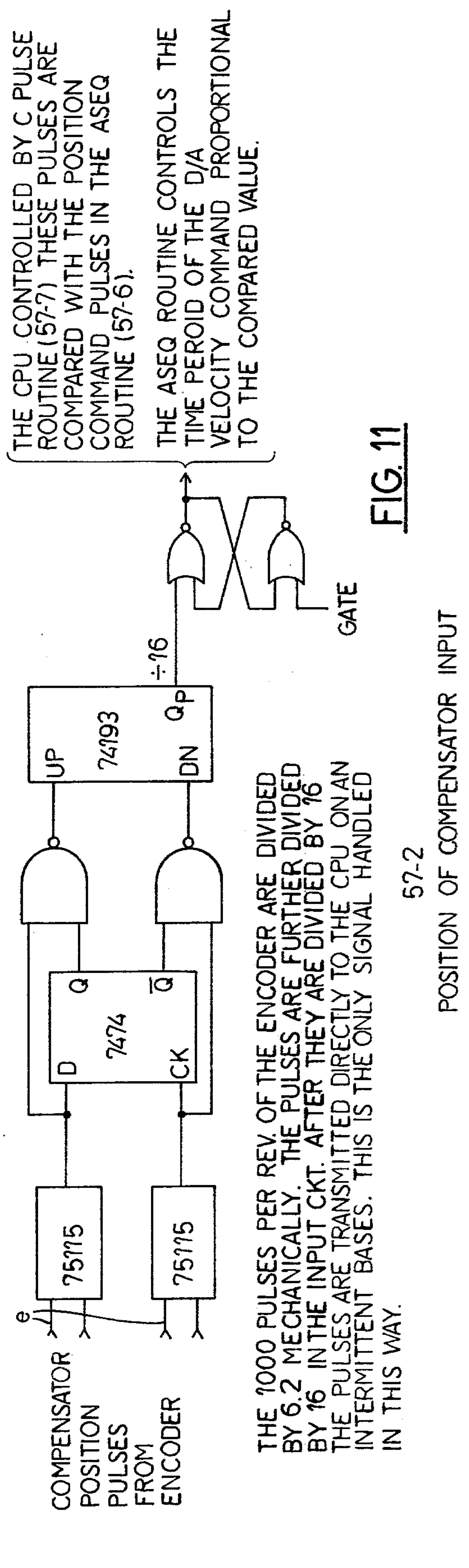
Figure 9:
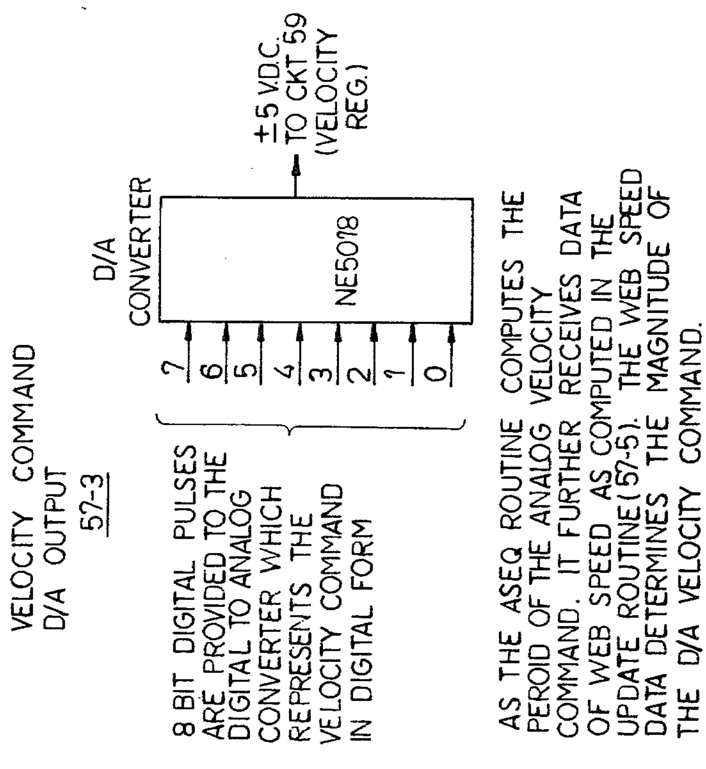
Figure 10:
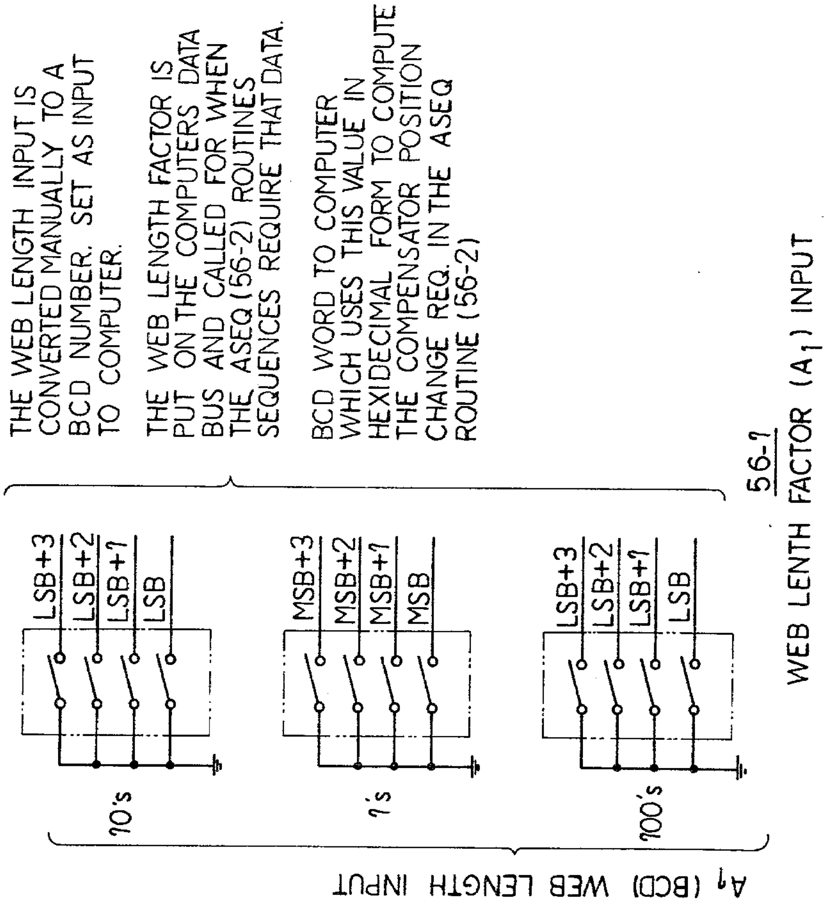

As soon as the operator jogs the compensator 15 into the correct position by means of switch 70A the desired relationship between mark 40 and mark 41 is established. The relationship between marks 40 and 41 as established by the operator, is memorized by means of the cylinder position pulse count which is produced by the encoder 54 which is geared or connected in a one-to-one relationship with the gravure cylinder 21. The pulses from the cylinder encoder 54 are counted and the relationship between marks 40 and 41 is digitally computed, representing a particular count value in binary coded decimal (BCD) terms, which is memorized and available to be compared automatically to the continuous BCD count value between mark 40 and mark 41. The control circuit 53 computes any difference in count between the memorized count and the continuous ongoing count per repeat length between marks 40 and 41. At the same time the control circuit 57 begins controlling the relationship between the marks 40 and 41 as a result of a BCD error count signal B which comes initially from circuit 53 as a result of the aforementioned computation. See FIGS. 8 and 6B. The BCD error signal B is a plus and minus count value which represents the error or difference in position between marks 40 and 41. The serial BCD information is transmitted as a signal on line B in circuit 55-4 via an asynchronous transmitted mounted in the error measurement control 53. It transmit the BCD error signals by means of a UART LSI integrated circuit 55-4 in serial format through line drivers and line receivers to the UART located at 55-4. The output of the receiving UART is a BCD signal which contains information identical to that which had been transmitted from the transmitting UART. It is provided to the computer as required and is represented as a hexidecimal error value for use in the UART SVC routine provided by circuit 55-1. The hexidecimal error value must be converted to a value of error in inches for the purposes of proportional control. This is accomplished by the ASEQ routine of circuit 55-2 (FIG. 7). The circuit 55-2 needs a signal from the circuit 55-3 which is a signal represented in hexidecimal form and which is a count value of the repeat length of the web 13 being printed. The repeat length is computed in circuit 55-6 by means of incoming signals at lines A and C. The signal at line A represents an input from the cylinder reference pulse generator 54. This is a digital pulse which signifies one revolution of the gravure cylinder 23. The other signal at line C comes from the web speed encoder 60. These pulses represent a calibrated value in terms of a given number of pulses per inch and that value is counted or computed between reference pulses in circuit 55-6. The computation in circuit 55-6 represents a calibrated pulse count of the repeat length in inches. The repeat length in inches is applied to the data bus of the computer and it is called for by the INIT routine circuit 55-3. The repeat length is also called for by the circuit 55-2, for the purposes of error computation in inches. The circuit 55-2 performs that error computation in inches by the shown formulas and outputs the error value in inches on signal line D which goes to the circuit 56 that is programmed to compute the required position change relative to the register error of the compensator 15. (FIG. 6D) The ASEQ routine of circuit 56-2 is programmed to execute equation (EQ-5) (FIG. 10). The ASEQ routine receives the web length factor from the data bus as set by circuit 56-1. The computer is provided with the web length factor by means of circuit 56-1. The web length factor is a BCD word or signal to the computer. The computer uses this value represented in hexidecimal form to compute the compensator position requirement through the ASEQ routine in circuit 56-2. The signal at line i is a hexidecimal count value which represents the position change requirement for the compensator 15. It is a digital value that represents both the direction and the magnitude of the required position change. The position change value i is received from the data bus by the ASEQ routine circuit 57-6 and that value is compared on an interrupt basis to the signal e entered on the data bus which represents the position change of the compensator. This signal is provided by circuit 57-2 (FIG. 11) which represents the input from the compensator position encoder 58A. The compensator position encoder signal from 58A provides two pulse trains which are 90° out of phase with each other. Phase A leads phase B in the clockwise direction. This provides directional information as well as magnitude information of compensator position in the form of digital pulses. Circuit 57-2 provides the pulses on an interrupt basis directly to the central processing unit 57 of the computer. Through the C pulse counter routine of pulse counter circuit 57-7, these pulses are counted and the relationship of these pulses with respect to the magnitude and direction of motion of the web compensator 15 are stored for the purposes of providing the ASEQ routine circuit 57-6 with the proper information to compare the position command signal to the actual position signal of the compensator 15 as it is being commanded to change. The ASEQ routine of circuit 57-6 outputs the difference of the two pulses, (Signal i minus the pulses form signal e) to the velocity limit logic control circuit 57-4, which is again in the ASEQ routine circuit which is programmed to limit the velocity reference signal count directly proportional to web speed. This portion of the ASEQ routine of circuit 57-5 receives these velocity count values represented in hexidecimal form from the UPDATE routine of circuit 57-5 (FIG. 7). The UPDATE routine simply counts the number of pulses in a given time period and according to a calibrated value determines actual speed of web 13 for the purposes of this value being called by the ASEQ routine circuit to limit the velocity pulse count wth respect to web speed (see web tachometer roll dia. cal. (FIG. 7). The ASEQ routine provides digital pulses to the digital to analog converter circuit 57-3 (FIG. 9) which represents the velocity command in digital form. The count value of the digital pulses represents the velocity requirement for the web compensator 15 or the cylinder compensator. The length of time that those pulses are present at output F (FIG. 6D) determines the position requirement for the velocity control. A plus and minus 5-volt DC signal is provided as a signal at line F a period (time) proportional to register error and the magnitude proportionate to web speed. The signal at line F goes to circuit 59 (FIG. 6A) which represents the velocity command voltage. It is summed through a differential amplifier 59*a* with the analog voltage zero to plus and minus 13 volts DC signal at line g which represents zero to plus and minus 1,860 RPM of the compensator drive motor 18. This signal at line g which is the velocity tachometer signal is provided by device 58-B which is a DC tachometer whose output is 7 volts per thousand RPM. The two signals are compared through this differential operational-amplifier 59*a* and the output becomes a signal at line 59*d* which is a current reference which is an amplitude modulated plus and minus DC signal for control of the DC amplifier 61 that controls DC motor 18. Motor 18 is mechanically coupled through the compensator mechanism 17. When the DC motor 18 turns clockwise the compensator 15 is driven in a direction which advances the position of the mark 40 (which is the mark being printed) with respect to the mark 41 (which is the mark that has previously been printed).

As a general comment to the discussion of the circuit of FIG. 6, all inputs to the computer are provided when the computer routine requests that particular data. The only exception to this is the data from the compensator position encoder 58A. This data is received by circuit 57 on an interrupt basis.

FIGS. 3 and 5 are schematic representations of web compensation and cylinder compensation mechanisms, respectively. As FIG. 3 shows, in web compensation, movement of compensator 15 in a direction and magnitude of $\frac{1}{2}\times$ will produce an eventual register change of mark 41 with respect to mark 40 which is a distance x from an initial mark 41 position in line with mark 40. The number of cylinder revolutions that occur before full correction results is defined by the ratio of the web length in path to the circumference of the gravure cylinder 21. For example, with respect to FIG. 5, $$\text{No. of revolutions} = \frac{\text{Web Length}}{\text{Cylinder circumference}}$$

if the web length is 30 feet, and the cylinder circumference of 21 is two feet. Then the number of revolutions=30 ft./2 ft.=15 ft. for full correction of x to take place as seen on the web 13 exiting from cylinder 21A.

From this example, it is apparent that as far as the upstream web path is concerned, the concept of register control is equivalent between cylinder and web compensation, and the register control system in accordance with the invention, as hereinbefore described, is applicable to a cylinder compensation system such as is shown in FIG. 5, wherein angular rotation of cylinder 21A in the appropriate direction is the corrective action taken, instead of movement of a compensator 15, such as is shown in FIG. 4.

I claim:

1. A method of register control for a web which extends between a pair of spaced apart members which perform successive processing operations therein, comprising the steps of:

employing an adjustably movable compensator mechanism for controlling web strain between said pair of members;

identifying a nominal compensator mechanism position wherein successive processing operations are in register;

ascertaining the actual web length between said pair of members when successive processing operations are in register;

measuring the magnitude and determining the direction of a register error between successive processing operations when said error occurs;

calculating, on the basis of a relationship between said nominal compensator mechanism position, web length and the magnitude and direction of said register error, a new compensator mechanism position which will effect a change in web strain sufficient to eliminate said register error;

and moving said compensator mechanism to said new compensator mechanism position.

2. A method of register control in web processing apparatus which includes a pair of spaced apart members for performing successive processing operations on said web and between which the web extends and an adjustably movable compensator mechanism for imposing a strain on the web between said pair of members and thereby effecting control of the length of the web between said pair of members, comprising the steps of:

moving said compensator mechanism to a null position wherein said successive processing operations on said web are in register and identifying said null position;

ascertaining the actual length of the web between said pair of members when said successive processing operations on said web are in register;

measuring the magnitude and direction of a register error between successive processing operation when said error occurs;

ascertaining, on the basis of a relationship between web length and the magnitude and direction of said register error, a new position to which said compensator mechanism needs to be moved relative to said null position to change web strain and to effect a change in the length of web between said pair of members necessary to eliminate said register error;

and moving said compensator mechanism from said null position to said new position.

3. A method according to claim 2 wherein said movable compensator mechanism comprises a web compensator mechanism which is moved transversely relative to said web.

4. A method according to claim 2 wherein said movable compensator mechanism comprises a cylinder compensator mechanism which is rotated angularly relative to said web.

5. Register control apparatus for a printing press having an adjustably movable compensator mechanism to, in effect, adjust web length between printing roller nips in successive printing decks to correct for printing registration errors comprises:

means for providing programmed electronic signal information representative of actual web length and compensator mechanism null position wherein no registration error occurs;

means for sensing and receiving incoming signal information relative to web speed; direction, magnitude and rate of registration error; and change of position of the compensator mechanism;

and means for performing computing operations on the programmed signal information and incoming signal information and providing an output signal to locate the compensator mechanism in a position wherein register error is eliminated.

6. Register control apparatus according to claim 5 wherein said movable compensator mechanism comprises a web compensator mechanism.

7. Register control apparatus according to claim 5 wherein said movable compensator mechanism comprises a cylinder compensator mechanism.

8. A register control system for web processing apparatus which includes a pair of spaced apart members for performing successive processing operations on said web and between which said web extends comprising:

an adjustably movably compensator mechanism for controlling the length of web between said pair of nips;

means for adjustably moving said compensator mechanism;

means for sensing the magnitude and direction of a register error and for providing signal information relative thereto;

and computer means operative to: receive said signal information; to ascertain, on the basis of the relationship between the known actual web length between said pair of members when no register error exists, a nominal position of said compensator mechanism when no register error exists, and the magnitude and direction of said register error, a new position to which said compensator mechanism needs to be moved to effect a change in the web length necessary to eliminate said register error;

and to provide an output signal representative of said new position to said means adjustably movably moving said compensator mechanism.

9. A register control system for web processing apparatus which includes a pair of spaced apart members for performing successive processing operations on said web and between which said web extends comprising:

an adjustably movable compensator mechanism for controlling the web strain between said pair of members;

means for adjustably moving said compensator mechanism;

means for sensing the magnitude and direction of a register error and for providing signal information relative thereto;

means for sensing web speed and for providing signal information relative thereto;

means for sensing a nominal position and change in position of said compensator mechanism and for providing signal information relative thereto;

and computer means opertive to: receive said signal information; to ascertain, on the basis of the relationship between known actual web length between said pair of members when no register error exists and said nominal position of said compensator mechanism when no register error exists, a new position to which said compensator mechanism needs to be moved relative to said nominal position to effect a change in web length necessary to eliminate said register error;

and to provide an output signal representative of said new position to said means for adjustably moving said compensator mechanism to said new position.

10. A register control system for web processing apparatus which includes a pair of spaced apart members for performing successive processing operations on said web and between which the web extends comprising:

an adjustably movable compensator mechanism for imposing a strain on the web between said pair of members and thereby effecting control of the length of the web between said pair of nips, said compensator mechanism being movable to a nominal position wherein said successive processing operations on said web are in register;

and means for identifying said position and for providing signal information relative thereto;

means for providing signal information relative to actual web length between said pair of members when said successive processing operations on said web are in register;

means for measuring the magnitude and direction of a register error between successive processing steps when said error occurs and for providing signal information relative thereto;

computer means for receiving said signal information and ascertaining, on the basis of a relationship between the known web length, said nominal position of said compensator mechanism and said signal information, a new position to which said compensator mechanism needs to be moved relative to said nominal position to effect a change in the length of web between said pair of members necessary to eliminate said register error, said computer means providing an output signal representative of said new position;

and means responsive to said output signal for moving said compensator mechanism from said nominal position to said new position.

11. In a register control system for web processing apparatus including at least two spaced stations whereat operations are repetitively performed on a web extending and moving therebetween, in combination:

an adjustably movable compensator mechanism for actuating upon said web at a location between said stations to change the length of web therebetween, said compensator mechanism having a predetermined position relative to said web whereat web length is such that no registration error occurs;

positioning means for moving said compensator mechanism;

first means for sensing register errors in the operations being performed on said web and for providing error signals related thereto;

second means for sensing the speed of said web and for providing a speed signal related thereto;

third means for sensing the position of said compensator mechanism and for providing a position signal related thereto;

and a control means for receiving said error signals and for determining the direction of register error, the magnitude of register error, the rate of change of register error, and the rate of compensation of register error;

for receiving said speed signal and for determining web speed;

and for receiving said position signal and for determining compensator mechanism position and for providing a control signal based on the relationship therebetween for regulating said positioning means to move said compensator mechanism to a position whereby the length of said web is changed and said register errors are eliminated.

12. A control system according to claim 11 wherein said control means includes adjustable means for initially moving the position of said movable compensator relative to said web whereby no register error occurs.

13. A method of register control for a web which extends between a pair of spaced apart members which perform successive processing operations therein, comprising the steps of:

employing an adjustably movable compensator mechanism for controlling web strain between said pair of members;

identifying a nominal compensator mechanism position wherein successive processing operations are in register;

ascertaining the web length between said pair of members when successive processing operations are in register;

measuring the magnitude and determining the direction of a register error between successive processing operations when said error occurs;

measuring web speed;

measuring the rate of change of magnitude of a plurality of register errors;

ascertaining on the basis of the relationship between the rate of change of magnitude of register errors and web speed whether said change of magnitude of register error is a short-term or a long-term condition;

calculating, on the basis of a relationship between said nominal compensator mechanism position, web length and the magnitude and direction of said register errors, a new compensator mechanism position which will effect a change in web strain sufficient to eliminate said register error;

and moving said compensator mechanism to said new compensator mechanism position or to a new nominal position, depending on whether said rate of change is a short-term or a long-term condition, respectively.

14. Register control apparatus for a printing press having an adjustably movable compensator mechanism to, in effect, adjust web length between printing roller nips in successive printing decks to correct for printing registration errors comprises:

means for providing programmed electronic signal information representative of web length and compensator mechanism null position wherein no registration error occurs;

means for sensing and receiving incoming signal information relative to web speed; direction, magnitude and rate of registration error; and change of position of the compensator mechanism;

and means for performing computing operations on the programmed signal information and incoming signal information and providing an output signal to locate the compensator mechanism in a position wherein register error is eliminated; said means for performing computing operations including:

means for ascertaining the proportion between the register error and compensantor mechanism position;

means for ascertaining the derivative between the rate of change of register error and the rate of change of compensator mechanism position;

and means for integrating to establish the average magnitude of register error and relating it to the optimum position requirement of the compensator mechanism wherein register error is eliminated.

* * * * *